United States Patent
Seidl et al.

(10) Patent No.: US 10,134,516 B2
(45) Date of Patent: Nov. 20, 2018

(54) SENSOR RING

(71) Applicant: Bayerische Motoren Werke Aktiengesellschaft, Munich (DE)

(72) Inventors: Josef Seidl, Dingolfing (DE); Andreas Kirchberger, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/343,464

(22) Filed: Nov. 4, 2016

(65) Prior Publication Data

US 2017/0062108 A1 Mar. 2, 2017

Related U.S. Application Data

(63) Continuation of application No. PCT/EP2015/055300, filed on Mar. 13, 2015.

(30) Foreign Application Priority Data

May 7, 2014 (DE) .......................... 10 2014 208 510

(51) Int. Cl.
*G01B 7/30* (2006.01)
*H01F 7/02* (2006.01)
(Continued)

(52) U.S. Cl.
CPC .............. *H01F 7/02* (2013.01); *B60B 27/00* (2013.01); *B60T 8/329* (2013.01); *F16C 41/007* (2013.01);
(Continued)

(58) Field of Classification Search
CPC ........ G01D 5/147; B60B 27/00; F16C 41/007
(Continued)

(56) References Cited

U.S. PATENT DOCUMENTS

| 5,407,213 A | 4/1995 | Ouchi et al. |
| 8,191,973 B2 * | 6/2012 | Pahle ...................... B60T 8/329 188/181 A |

(Continued)

FOREIGN PATENT DOCUMENTS

| CN | 1627080 A | 6/2005 |
| DE | 42 31 332 A1 | 4/1993 |

(Continued)

OTHER PUBLICATIONS

International Search Report (PCT/ISA/210) issued in PCT Application No. PCT/EP2015/055300 dated Jun. 19, 2015 with English translation (eight pages).

(Continued)

*Primary Examiner* — Reena Aurora
(74) *Attorney, Agent, or Firm* — Crowell & Moring LLP

(57) ABSTRACT

A sensor ring is provided for a magnetic measuring transducer of an ABS system consisting of at least two annularly arranged functional elements. The first functional element is formed as a ferromagnetic annular disc element with a flat upper side and a flat underside with a multiplicity of openings. The second functional element, as a non-ferromagnetic element, has either been applied on the upper side and/or the underside of the annular disc element and/or has been introduced into the openings, as an annular disc element. The sensor ring is protected from contamination or damage by the non-ferromagnetic covering. The covering may also be produced by encapsulation or filling, wherein the openings in the sensor ring can be filled with plastic and also the side faces can be coated with plastic.

13 Claims, 4 Drawing Sheets

(51) Int. Cl.
*G01P 3/488* (2006.01)
*G01D 5/245* (2006.01)
*B60T 8/32* (2006.01)
*F16C 41/00* (2006.01)
*G01D 5/244* (2006.01)
*B60B 27/00* (2006.01)

(52) U.S. Cl.
CPC ........... *G01D 5/244* (2013.01); *G01D 5/2451* (2013.01); *G01P 3/488* (2013.01); *F16C 2233/00* (2013.01)

(58) Field of Classification Search
USPC .................................................. 324/207.25
See application file for complete search history.

(56) References Cited

U.S. PATENT DOCUMENTS

| | | | |
|---|---|---|---|
| 8,636,417 B2* | 1/2014 | Kakuda | B60B 3/001 384/448 |
| 2002/0140418 A1 | 10/2002 | Ichiman | |
| 2003/0122539 A1 | 7/2003 | Heimann, Jr. et al. | |
| 2005/0127904 A1 | 6/2005 | Tawara | |
| 2016/0124056 A1* | 5/2016 | Ikeda | G01P 3/443 324/207.2 |
| 2016/0209240 A1* | 7/2016 | Pfaffinger | G01D 5/2033 |

FOREIGN PATENT DOCUMENTS

| | | |
|---|---|---|
| DE | 42 30 043 A1 | 3/1994 |
| DE | 198 50 322 A1 | 5/2000 |
| DE | 10 2006 031 718 A1 | 1/2008 |
| DE | 10 2006 049 999 A1 | 4/2008 |
| EP | 0 213 732 A1 | 3/1987 |
| EP | 0 594 452 B1 | 4/1994 |
| WO | WO 98/57117 A1 | 12/1998 |
| WO | WO 03/058255 A1 | 7/2003 |
| WO | WO 2013/157999 A1 | 10/2013 |

OTHER PUBLICATIONS

German-language Written Opinion (PCT/ISA/237) issued in PCT Application No. PCT/EP2015/055300 dated Jun. 19, 2015 (seven pages).

German Search Report issued in counterpart German Application No. 10 2014 208 510.1 dated Oct. 24, 2014 with partial English translation (14 pages).

Chinese Office Action issued in counterpart Chinese Application No. 201580005105.9 dated May 3, 2018 with English translation (nineteen (19) pages).

* cited by examiner

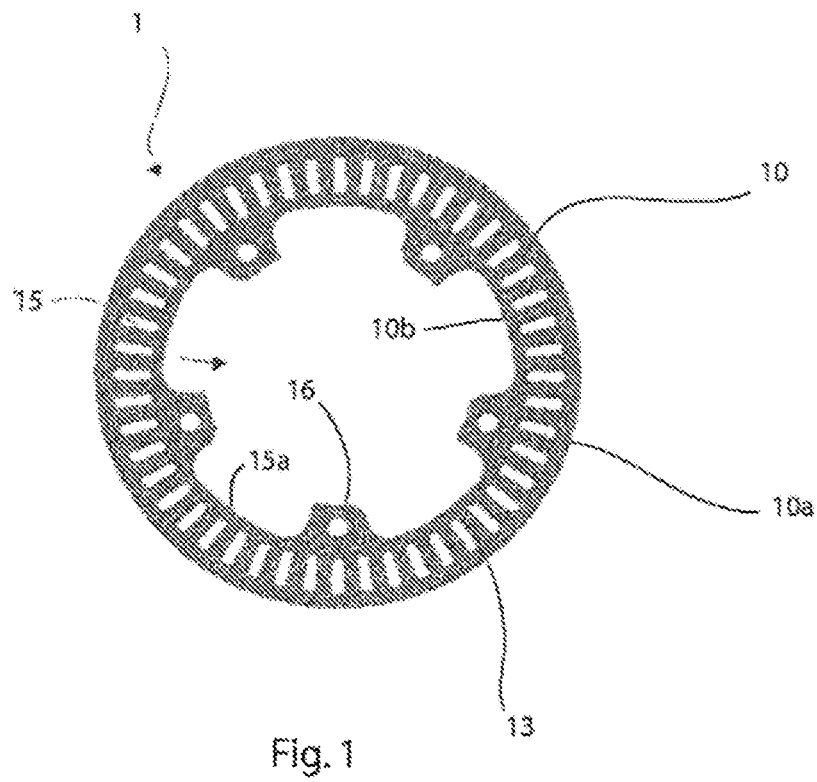
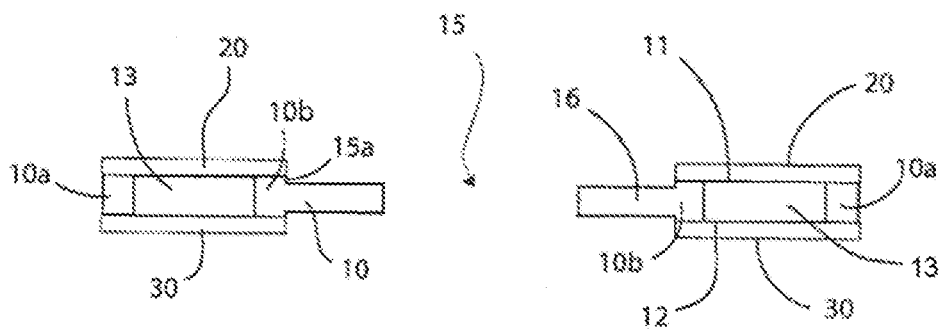
Fig. 2

SENSOR RING

CROSS REFERENCE TO RELATED APPLICATIONS

This application is a continuation of PCT International Application No. PCT/EP2015/055300, filed Mar. 13, 2015, which claims priority under 35 U.S.C. § 119 from German Patent Application No. 10 2014 208 510.1, filed May 7, 2014, the entire disclosures of which are herein expressly incorporated by reference.

BACKGROUND AND SUMMARY OF THE INVENTION

The invention relates to a sensor ring for a magnetic measuring transducer of an ABS system. The present invention accordingly relates to a sensor ring which is preferably characterized by a multi-layer structure in which the external layer or layers are formed from a non-ferromagnetic material, preferably from plastic.

The sensor ring according to the invention is used, for example, for measuring the speed of a wheel. In the prior art, for example, toothed wheels are known for a magnetic speed measuring transducer.

EP-A-213 732 discloses a ring gear as is known from the prior art. When a vehicle wheel of a passenger car, a motorcycle or some other vehicle is equipped with an anti-lock brake system (ABS system) which acts during braking, it is desirable to determine the rotational speed of the wheel.

For this purpose, magnetic measuring transducers are typically used which are arranged on a respective wheel mount. Such measuring transducers determine the necessary information from the magnetic field, wherein the magnetic field changes with the frequency by which the teeth of the toothed wheel mounted with the wheel of the vehicle pass by.

However, in practice, various disadvantages of such known toothed wheels have become apparent. Owing to the position of the wheels in the wheel housings or in the region of mudguards of the vehicle, the ring gears can be damaged by foreign bodies, stones or the like. Particles of dust or foreign bodies on the roadway can also become caught in the ring gear and thereby adversely affect its function.

As soon as the measuring transducers are damaged, the anti-lock protection system may even fail completely.

EP 0594452 B1 discloses a solution for a ring gear for a wheel speed sensor which proposes an improved ring gear in order to avoid the risk of damage to the magnetic measuring transducers and failure of the wheel anti-lock systems which act during braking, as described above.

For this purpose, EP 0594452 B1 proposes that the external circumferential toothing of the ring gear, specifically the gaps between the teeth of the ring, are filled with elements made of non-magnetic plastic wherein a ring is provided which forms a cylindrical circumferential face and is accommodated in a recess of the gear.

The complex fabrication and the necessary precision of the positional tolerances and shape tolerances are disadvantageous here. The ring has to be fabricated in a cost-intensive fashion in a special device and connected to the ring gear in a further working step. In addition, the mechanical cohesion during continuous operation is not readily ensured.

The invention is therefore based on the object of overcoming the abovementioned disadvantages and providing an improved solution for a sensor ring which has, in particular, good mechanical strength, is easy and cost-effective to produce and is resistant to dirt and damage.

This and other objects are achieved by a sensor ring for a magnetic measuring transducer of an ABS system. The sensor ring is made of at least two functional elements which are arranged in an annular shape. The first functional element is embodied as a ferromagnetic annular disk element with a flat upper side and a flat underside with a multiplicity of openings. The second functional element is a non-ferromagnetic element and is applied either as an annular disk element to the upper side and/or the underside of the annular disk element, and/or is inserted into the openings of the first functional element.

The basic concept of the present invention is to provide a multi-layer, preferably two-layer or three-layer, sensor ring which is composed of functional elements and in which one functional element has been formed from a ferromagnetic material with openings in the functional element. This functional element is connected and/or surrounded in a positively locking or frictionally locking fashion with at least one further non-ferromagnetic functional element which is preferably applied in a layer. Combinations of one or more further functional elements can also be formed alternatively or additionally. It is therefore possible, for example, for the sensor ring to be formed from a central functional element composed of a ferromagnetic material together with two non-ferromagnetic functional elements which surround the central functional element in a "sandwich-like" fashion.

According to the invention, a sensor ring for a magnetic measuring transducer of an ABS system is therefore provided which is composed of at least two functional elements which are arranged in an annular shape, wherein the first functional element is embodied as a ferromagnetic annular disk element with preferably one flat upper side and one flat underside with a multiplicity of openings, and wherein the at least second functional element or elements is/are applied as non-ferromagnetic element(s) either as an annular disk element to the upper side and/or the underside of the annular disk element, respectively, and/or a non-ferromagnetic functional element has been inserted into the openings.

In one preferred embodiment of the invention the annular disk elements, which form the sensor ring, are securely connected to one another in a positively locking and/or frictionally locking fashion by way of a connecting method. As a result, a high degree of resistance for commercially customary use is achieved.

It is therefore particularly advantageous to connect the annular disk elements to one another by bonding, joining, crimping, clamping or attaching or encapsulating by injection molding.

In one embodiment of the invention, the sensor ring is equipped such that the non-ferromagnetic annular disk element or elements are formed from a foil, and are advantageously applied to the side faces of the ferromagnetic annular element.

In a further preferred embodiment of the invention, a non-ferromagnetic annular disk element is shaped around the outer edge of the ferromagnetic annular disk element or engages around the outer edge with the exception of the opposite side. This may be done, for example in the case of a non-ferromagnetic, deformable material, by crimping around the edge.

It is also advantageous if the outer edge of the ferromagnetic annular disk element has been bent at a right angle or bent with the result that, on the one hand, the stability of the sensor ring is increased and, on the other hand, a functional edge is formed.

In one advantageous embodiment of the invention, the material of the annular disk element or elements is composed of plastic. It is therefore possible for an annular cover composed of plastic with elements which engage around on the outer edge to serve as an annular disk element which is latched on by means of the ferromagnetic annular disk element, and in the connected state the elements which engage around engage around the edge of the ferromagnetic annular disk element.

In one alternative embodiment of the invention, the material of the annular disk element or elements can also be formed from non-ferromagnetic metal, preferably from aluminum. As a result, in one connecting method the annular disk-shaped metal element can be crimped round the edge of the ferromagnetic annular disk element, with the result that a permanently secure connection is achieved.

An embodiment in which the openings of the ferromagnetic annular disk element have been filled with a non-ferromagnetic material in a positively locking fashion by injection molding, and thereby a positively locking composite made of both materials being formed, is also advantageous.

In one particularly preferred embodiment of the invention, the annular disk element has an essentially round central opening for mounting on a wheel hub, and a plurality of mounting elements (for example mounting tabs with drilled holes) extend from the radially inner edge of the annular disk element inward into the region of the central opening, wherein the side faces of the mounting tabs are not covered by a non-ferromagnetic annular disk element.

In one possible embodiment, the openings in the annular disk element could extend on one side as far as the edge, but this involves partial weakening of the stability. It is therefore advantageous if the openings, which are arranged equidistantly within the annular disk element, are made in such a way that in each case an inner and an outer annular section radially surround or bound the openings.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a plan view of a ferromagnetic annular disk element of a sensor ring according to an exemplary embodiment of the invention;

FIG. 2 shows a side view of a three-layer sensor ring,

DETAILED DESCRIPTION OF THE DRAWINGS

Figure 3:
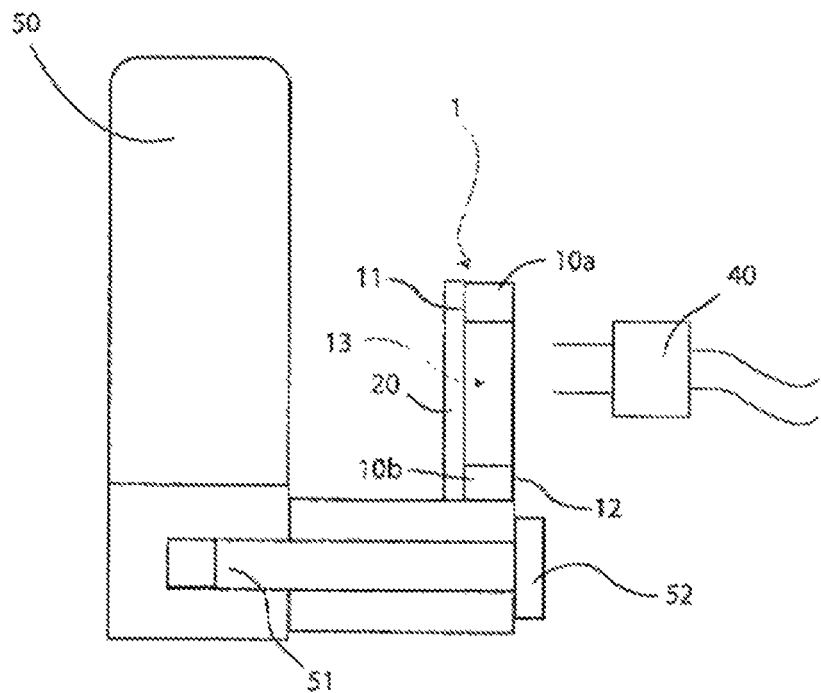
FIG. 3 shows a schematic partial sectional view through a sensor ring, according to an exemplary embodiment of the invention.

FIG. 1 illustrates a plan view of a ferromagnetic annular disk element 10 of a sensor ring 1 according to an exemplary embodiment of the invention. FIG. 2 is a lateral sectional view of a three-layer sensor ring composed of three annular disk elements 10, 20, 30. The annular disk element 10 of the sensor ring 1 has an essentially round central opening 15 for mounting on a wheel hub. In addition, the annular disk element 10 has an inner and an outer annular section 10a, 10b which are formed with a continuous circumference, i.e. as a complete ring which is closed over 360°. A plurality of mounting tabs 16 extend from the inner edge 15a, away from the annular disk element 10 into the region of the central opening 15. In the region of the annular disk element 10, the sensor ring 1 has a multiplicity of equidistantly formed openings 13, which extend as elongated holes in the radial direction. These openings 13, embodied as elongated holes, of the annular disk element 10 are arranged in such a way that the inner and outer annular sections 10a, 10b each radially bound the openings 13.

In FIG. 2, the sensor ring 1 also has two functional elements 20, 30, which are arranged in an annular shape. The one functional element 20 is applied to the upper side 11, and the other 30 to the underside 12 of the ferromagnetic annular disk element 10. The three annular disk elements 10, 20, 30 are securely connected to one another via a connecting method. In the present exemplary embodiment these are bonded to one another.

The mounting tabs 16 are exposed on both side faces and are not covered by a non-ferromagnetic annular disk element 20, 30. According to the embodiment in FIGS. 3 to 6, the annular disk elements 20, 30 each cover an upper side and/or an underside of the ferromagnetic annular disk element 10.

As is also apparent in FIGS. 3 to 6, the sensor ring 1 is used together with a magnetic measuring transducer 40 of an ABS system which is mounted laterally in the region next to the openings at a defined distance, in order to determine the rotational speed of the wheel 50. The sensor ring 1 is therefore attached to the wheel hub 51 by way of screws or bolts 52.

Figure 4:
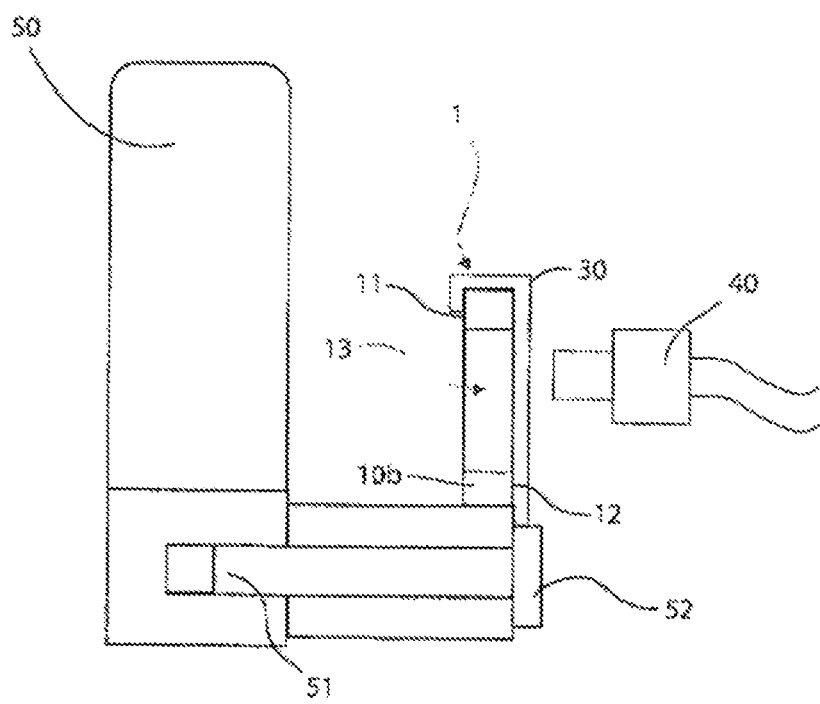
FIG. 4 shows a schematic partial sectional view through a sensor ring, according to a further exemplary embodiment of the invention.
Figure 5:
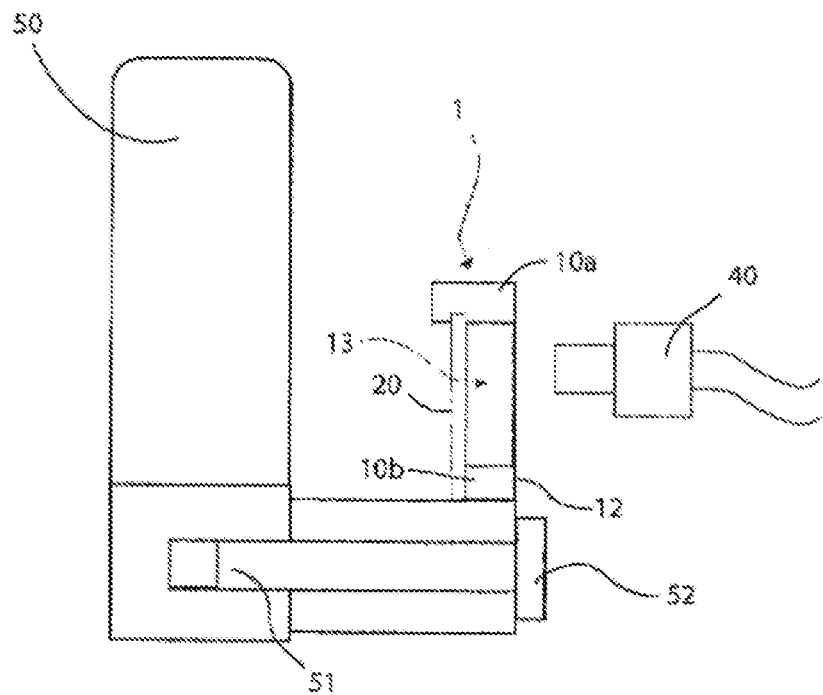
FIG. 5 shows a schematic partial sectional view through a sensor ring, according to a further exemplary embodiment of the invention.

FIGS. 3 to 6 show alternative embodiments of the sensor ring 1. In FIG. 3, a plastic cover 20 is attached on one side to the ferromagnetic annular disk element 10 and covers the side facing the wheel, i.e. the upper side 11. In FIG. 4, the annular disk element 30, which is embodied as a plastic cover 30, is shaped around the outer edge 14 of the annular disk element 10 and extends around over the outer edge 14 as far as the opposite side 11. In FIG. 5, there is an embodiment in which the cover 20 is crimped.

Figure 6:
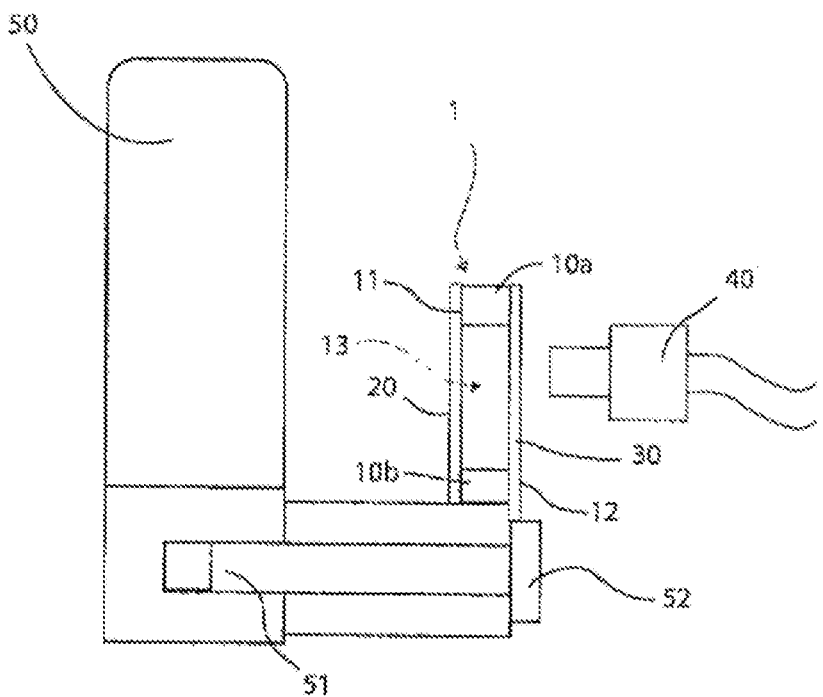
FIG. 6 shows a schematic partial sectional view through a sensor ring, according to a further exemplary embodiment of the invention.

In FIG. 6, an embodiment of the sensor ring 1 with three annular disk elements 10, 20, 30 is shown (similar to FIG. 2). In this embodiment, the annular disk elements 20, 30 have been applied as a foil on both sides 11, 12.

Figure 7:
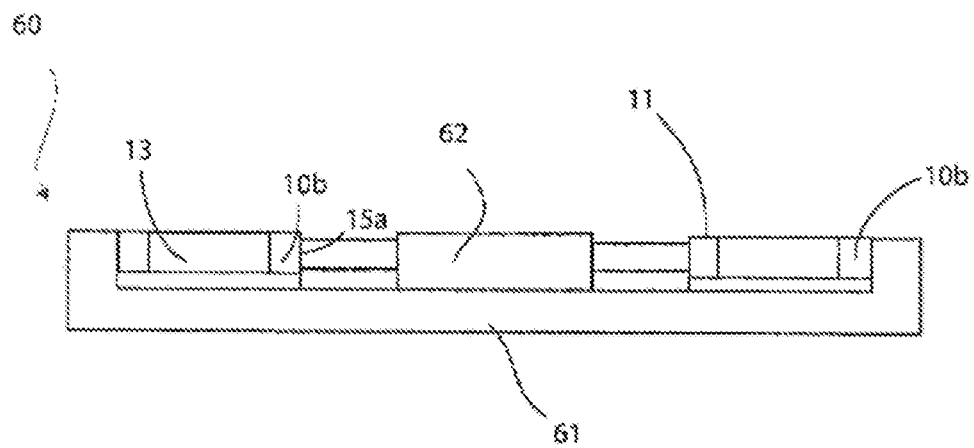
FIG. 7 shows a schematic sectional view through a production molding device for producing a sensor ring by way of casting.
Figure 8:
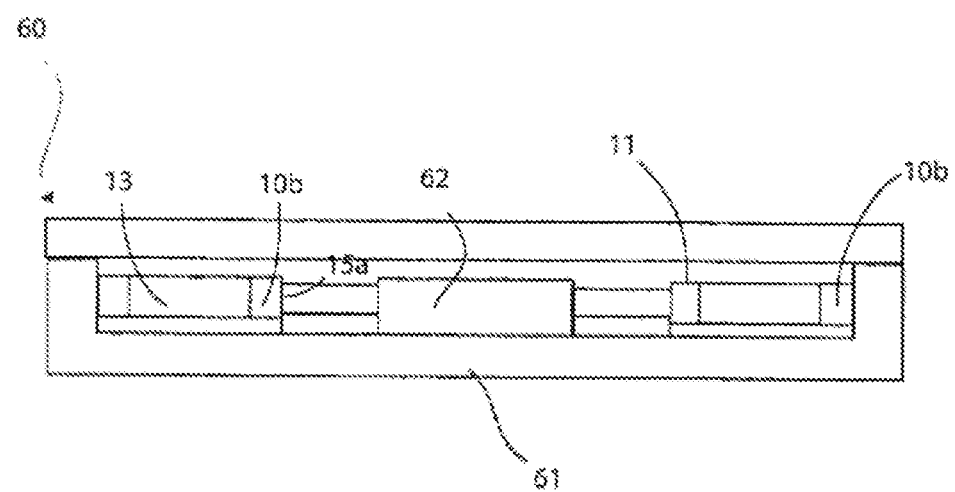
FIG. 8 shows a schematic sectional view through a production molding device for producing a sensor ring by way of encapsulation by injection molding.

FIGS. 7 and 8 each show a schematic sectional view through a production molding device 60 for producing a sensor ring by way of casting (FIG. 7) or by way of injection molding (FIG. 8). Different embodiment of the devices 60 for producing a sensor ring 1 as described above are contemplated.

The production molding devices 60 have a mold 61 into which the ferromagnetic annular disk element 10 is inserted. Depending on the position, mold element 61 and the shape of the cavity as such, the annular disk element is cast or encapsulated by injection molding in such a way that the openings 13 are filled as intended and, if appropriate, one or two lateral covers are also formed or integrally injection molded thereon. In this way, it is possible not only to fill the openings 13 but also, for example, at the same time to cover the sides 11, 12 with molding material in one fabrication step in order thereby to obtain the sensor ring 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sensor ring for a magnetic measuring transducer of an ABS system, the sensor ring comprising:
    a ferromagnetic annular disc element having a flat upper side and a flat underside and a multiplicity of openings;
    a non-ferromagnetic annular element applied on the flat upper side, the flat underside, or into the multiplicity of openings, wherein:
    the ferromagnetic annular disc element has a substantially round central opening configured to be mounted on a wheel hub, and
    a plurality of mounting tabs are located on the ferromagnetic annular disc element in a region of the central opening, the mounting tabs not being covered by the non-ferromagnetic annular disc element.

2. The sensor ring according to claim 1, wherein the ferromagnetic and non-ferromagnetic annular disc elements are securely connected to one another in at least one of a positive and frictionally locking manner.

3. The sensor ring according to claim 2, wherein the ferromagnetic and non-ferromagnetic annular disc elements are securely connected to one another via one or more of: bonding, joining, crimping, clamping, screwing, riveting or injection molding encapsulating.

4. The sensor ring according to claim 1, wherein the non-ferromagnetic annular disc element is a foil.

5. The sensor ring according to claim 1, wherein the non-ferromagnetic annular disc element is shaped around an outer edge of the ferromagnetic annular disc element as far as an opposite side.

6. The sensor ring according to claim 1, wherein the non-ferromagnetic annular disc element is made of plastic.

7. The sensor ring according to claim 1, wherein the non-ferromagnetic annular disc element is made of a non-ferromagnetic metal.

8. The sensor ring according to claim 7, wherein the non-ferromagnetic metal is aluminum.

9. The sensor ring according to claim 1, wherein the ferromagnetic annular disc element has the multiplicity of openings filled with a non-ferromagnetic material in a positive locking manner via injection molding of the non-ferromagnetic material in the openings.

10. The sensor ring according to claim 1, wherein:
    the multiplicity of openings are arranged such that an inner and an outer annular section of the ferromagnetic annular disc element radially bound the openings.

11. The sensor ring according to claim 10, wherein the multiplicity of openings are arranged equidistantly in a circumferential direction of the ferromagnetic annular disc element.

12. The sensor ring according to claim 1, wherein a first non-ferromagnetic annular disc element is applied to the upper side of the ferromagnetic annular disc element and a second non-ferromagnetic annular disc element is applied to the underside of the ferromagnetic annular disc element.

13. The sensor ring according to claim 1, wherein the non-ferromagnetic annular element is applied into the multiplicity of openings.

\* \* \* \* \*